United States Patent
Mun et al.

(10) Patent No.: US 12,337,717 B2
(45) Date of Patent: Jun. 24, 2025

(54) DISTRIBUTED POWER SHARING TYPE ELECTRIC VEHICLE CHARGING SYSTEM

(71) Applicant: SK SIGNET INC., Jeollanam-do (KR)

(72) Inventors: Tae Eun Mun, Seoul (KR); Min Gyu Son, Seoul (KR); Young Jun Kim, Goyang-si Gyeonggi-do (KR); Ho Byung Chae, Seoul (KR); Jong Hoon Shin, Seoul (KR)

(73) Assignee: SK SIGNET INC., Jeollanam-do (KR)

( * ) Notice: Subject to any disclaimer, the term of this patent is extended or adjusted under 35 U.S.C. 154(b) by 0 days.

(21) Appl. No.: 18/892,487

(22) Filed: Sep. 22, 2024

(65) Prior Publication Data

US 2025/0010755 A1 Jan. 9, 2025

Related U.S. Application Data

(63) Continuation-in-part of application No. PCT/KR2023/000425, filed on Jan. 10, 2023.

(30) Foreign Application Priority Data

Mar. 31, 2022 (KR) .......................... 10-2022-0040484

(51) Int. Cl.
*B60L 53/67* (2019.01)
*B60L 53/10* (2019.01)
*B60L 53/62* (2019.01)

(52) U.S. Cl.
CPC .............. *B60L 53/67* (2019.02); *B60L 53/11* (2019.02); *B60L 53/62* (2019.02)

(58) Field of Classification Search
CPC ...................................................... B60L 53/67

(Continued)

(56) References Cited

U.S. PATENT DOCUMENTS

2011/0148353 A1* 6/2011 King ....................... B60L 58/20
320/109
2012/0056582 A1* 3/2012 Iwata .................... B60L 53/305
320/109

(Continued)

FOREIGN PATENT DOCUMENTS

JP 2014-75903 A 4/2014
KR 20130119813 A 11/2013

(Continued)

OTHER PUBLICATIONS

International Search Report for PCT/KR2023/000425 issued on Apr. 18, 2023.

(Continued)

*Primary Examiner* — Jerry D Robbins
(74) *Attorney, Agent, or Firm* — ZION IP; Byungwoong Park

(57) ABSTRACT

A distributed power-sharing electric vehicle (EV) charging. The system comprises multiple chargers connected via a network. Each charger includes a power module configured to store direct current (DC) power, an output port for supplying power to an electric vehicle, and a sharing port for exchanging power with at least one neighboring charger. First and second switches are positioned between the power module and the output port, and between the power module and the sharing port. A control unit is configured to control the operation of the power module and the switches in response to an EV charging request. When the maximum charging power required by the EV exceeds the rated output power of a single charger, the system delivers power from both the power module and the neighboring charger in an idle state.

6 Claims, 7 Drawing Sheets

(58) Field of Classification Search
USPC .......................................................... 320/109
See application file for complete search history.

(56) References Cited

U.S. PATENT DOCUMENTS

| | | | | |
|---|---|---|---|---|
| 2013/0057210 A1* | 3/2013 | Nergaard | ................ | B60L 53/11 |
| | | | | 320/109 |
| 2013/0310999 A1* | 11/2013 | Baxter | .................... | B60L 55/00 |
| | | | | 700/295 |
| 2014/0062401 A1* | 3/2014 | Gadh | ....................... | B60L 53/67 |
| | | | | 320/109 |
| 2017/0182900 A1* | 6/2017 | Ohkuma | ................. | B60L 53/50 |
| 2019/0241089 A1* | 8/2019 | Heyne | ..................... | B60L 53/31 |

FOREIGN PATENT DOCUMENTS

| | | |
|---|---|---|
| KR | 101602509 B1 | 3/2016 |
| KR | 20180051779 A | 5/2018 |
| KR | 20200081620 A | 7/2020 |
| KR | 20200099935 A | 8/2020 |
| KR | 20210079170 A | 6/2021 |
| KR | 102455901 B1 | 10/2022 |

OTHER PUBLICATIONS

Korean Patent Office Office action for Application No. 10-2022-0040484, issue on May 26, 2022.
Korean Patent Office Notice of Allowance for Application No. 10-2022-0040484, issue on Aug. 16, 2022.

* cited by examiner

DISTRIBUTED POWER SHARING TYPE ELECTRIC VEHICLE CHARGING SYSTEM

The present invention relates to a distributed power sharing type electric vehicle charging system, and more particularly, a distributed power sharing type electric vehicle charging system which can rapidly charge an electric vehicle connected to a charger by additionally utilizing a power of a peripheral charger that is currently unoccupied in a charging station.

BACKGROUND

With the rise of the 4th industrial revolution, electric autonomous driving vehicle technology is emerging as a matter of interest of the times, and the demand for high value-added technology is greatly increasing worldwide.

Recently, the government is leading the era of popularization of electric vehicles, and accordingly, the demand for high-convenience-oriented smart charging infrastructure and demand management technology is expanding through the establishment of charging infrastructure based on the 4th industrial revolution element technology and the development of leading technologies.

Chargers for electric vehicles are divided into slow chargers and quick chargers. These 50 kW chargers can charge 50 kW per hour, and recently, ultra-high-speed chargers of 100 kW or more are also in operation.

However, most of the 50 kW chargers have been operated so far, and even in this case, it takes a while to charge the battery to 80% or more, so there is a method to enhance a charging speed of electric vehicles without making major changes to the existing infrastructure.

The background technology of the present invention is disclosed in Korean Patent Publication No. 10-2020-0099935, which is published on Aug. 25, 2020.

SUMMARY

An object of the present invention is to provide a distributed power sharing type electric vehicle charging system capable of rapidly charging an electric vehicle connected to a charger by additionally utilizing a power of a peripheral charger currently not occupied in a charging station.

According to the present invention, in a distributed power sharing type electric vehicle charging system including: a plurality of chargers connected through a network, the charger may include a power module storing a DC power, an output port supplying a power output from the power module to an electric vehicle, a sharing port interconnected to a sharing port of at least one neighboring charger, and input with a power shared by the neighboring charger or delivering the power of the power module to the neighboring charger, first and second switches installed between the power module and the output port and between the power module and the sharing port, respectively, and a control unit controlling operations of the power module and each switch according to an electric vehicle charging request, and when a maximum charging power of the electric vehicle is greater than a rated output power of the charger, delivering both the power shared by the neighboring charger in a paired state with a neighboring charger in a current idle state, and the power output by the power module to the output port to rapidly charge the electric vehicle.

Further, when the maximum charging power of the electric vehicle recognized when connecting the electric vehicle is equal to or less than the rated output power of the charger, the control unit may turn on only the first switch to charge the electric vehicle by using only the output power of the power module.

Further, when the maximum charging power of the electric vehicle recognized when connecting the electric vehicle is greater than the rated output power of the charger, the control unit may form pairing with at least one neighboring charger in the idle state, which is currently unoccupied by checking charger occupancy situations of all neighboring chargers on a network, and the electric vehicle may be charged by using the power shared from at least one neighboring charger and the output power of the power module paired.

Further, when the maximum charging power is greater than the rated output part and all neighboring chargers are being occupied, the control unit may turn on only the first switch to charge the electric vehicle by using only the output power of the power module.

Further, in each of the plurality of chargers, a charger and the sharing port adjacent to each other in terms of a distance may be connected to each other by a cable. Further, the control unit may determine the maximum connection number of neighboring chargers by using a ratio acquired by dividing the maximum charging power by the rated output power.

Further, when a natural number M acquired by decimal rounding up of the ratio is a value equal to or greater than 2, the control unit may share the power in a paired state with a maximum of N−1 idle-state neighboring chargers.

Further, the rated output power of the charger may be a maximum power capacity emittable per hour from the charger, and the maximum charging power of the electric vehicle may be a maximum charging power capacity absorbable per hour in a battery of the electric vehicle.

According to the present invention, when an electric vehicle charging request is made, electric power is additionally shared from an unoccupied charger in consideration of a current occupancy situation of peripheral chargers, and power higher than a rated capacity determined per charger is provided to an electric vehicle, thereby charging the electric vehicle more rapidly.

In particular, in the case of the present invention, a power corresponding to n multiples of the rated capacity specified per charger can be provided to an electric vehicle based on a power shared in a neighboring charger, so an electric vehicle charging time can be reduced by 1/n as compared with a case of utilizing only one charger.

DETAILED DESCRIPTION OF EXEMPLARY EMBODIMENTS

Figure 1:
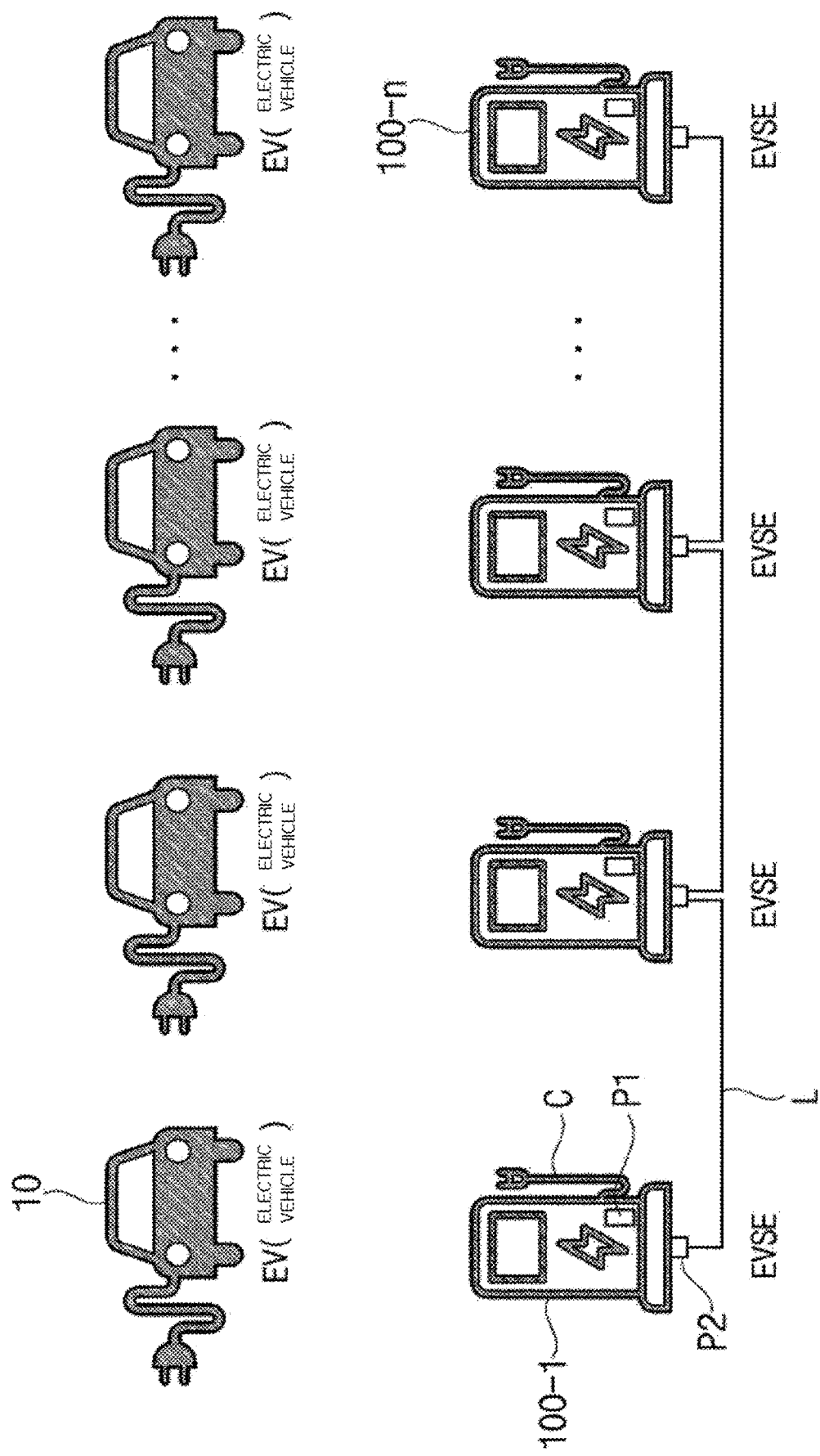
FIG. 1 is a diagram for describing a concept of a distributed power sharing type electric vehicle charging system according to an exemplary embodiment of the present invention.

Then, the present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. In addition, in the drawings, in order to clearly describe the present invention, a part not related to the description is not omitted and like reference numerals designate like elements throughout the specification.

Throughout the specification, when it is described that a part is "connected" with another part, it means that the part may be "directly connected" with another part and the parts may be "electrically or mechanically connected" to each other with still another element interposed therebetween. Further, when any part "includes" any component, unless explicitly described to the contrary, the word "comprise" and variations such as "comprises" or "comprising", will be understood to imply the inclusion of stated elements but not the exclusion of any other elements.

The present invention relates to a distributed power sharing type electric vehicle charging system, and when an electric vehicle charging request is made, electric power is additionally shared from an unoccupied charger in consideration of a current occupancy situation of peripheral chargers, and power higher than a rated capacity determined per charger is provided to an electric vehicle, thereby charging the electric vehicle more rapidly even in low-speed charging infrastructure environments.

Figure 2:
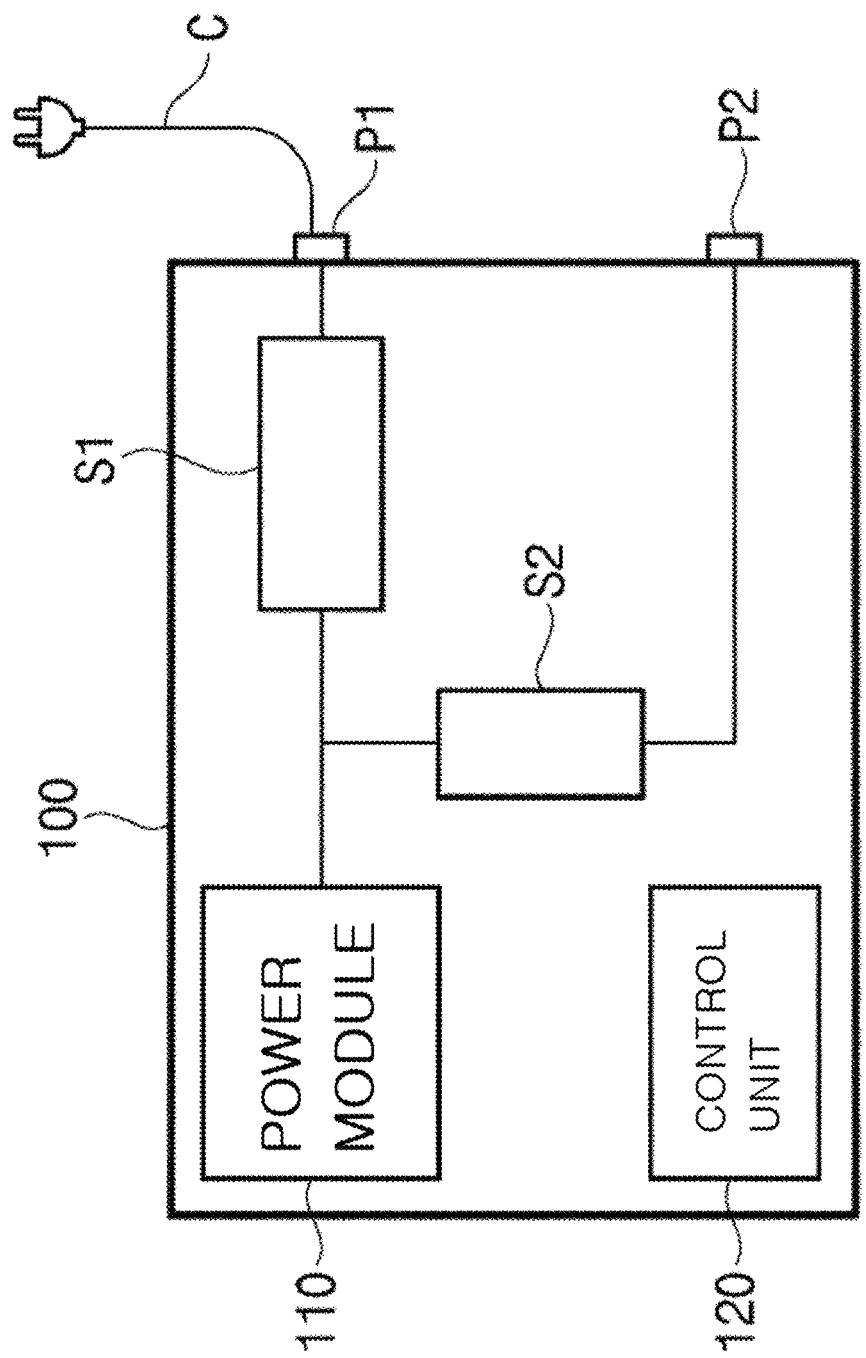
FIG. 2 is a diagram specifically illustrating a configuration of a charger illustrated in FIG. 1.

FIG. 1 is a diagram for describing a concept of a distributed power sharing type electric vehicle charging system according to an embodiment of the present invention and FIG. 2 is a diagram specifically illustrating a configuration of a charger illustrated in FIG. 1.

As illustrated in FIG. 1, the distributed power sharing type electric vehicle charging system according to an exemplary embodiment of the present invention includes a plurality of chargers 100, and respective chargers 100 are connected to communicate with each other in a charging station.

The plurality of chargers 100 is connected to each other through wired, wireless, or wired/wireless mixed networks to transmit and receive information in real time, and to check state information of the charger, e.g., charger occupancy state and a charging state, a charger ID, etc., with each other.

The charger 100 has a charging coupler C having a signal line and a power line embedded therein. When an electric vehicle 10 is connected to the charging coupler C, various information may be checked by communication with the electric vehicle 10 through the signal line, and a charging power may be provided to the electric vehicle 10 through the power line.

In the case of an exemplary embodiment of the present invention, the chargers may share the power with each other, and the electric vehicle may be charged by utilizing one or multiple chargers according to an occupancy situation of each charger and a charging specification of the electric vehicle. In particular, the power of the charger which is currently not occupied among peripheral chargers is additionally utilized to significantly shorten a charging time by increasing a charging speed as compared with a case of charging the electric vehicle by utilizing only one charger.

To this end, the charger 100 additionally includes a sharing port P2 which enables power sharing between the chargers 100 jointly with an output port P1 for providing a charging power to the electric vehicle, and in each charger 100, a charger and the sharing port P2 adjacent to each other in terms of a distance may be connected to each other in series by a cable L.

Specifically, as illustrated in FIG. 2, a charger 100 according to an exemplary embodiment of the present invention includes a power module 110, an output port P1, a sharing port P2, a first switch S1, a second switch S2, and a control unit 120.

Here, the control unit 120 may control operations of the power module 110, the first switch S1, and the second switch S2. Further, the control unit 120 has a communication module embedded therein, and is connected to communicate with another charger through a network.

The power module 110 is supplied with a DC power from an external power source, and stores it. The power module 100 may be connected to a power source such as an AC grid, a private AC power grid, or an ESS device, and may include a plurality of battery modules, an AC/DC converter, a DC/DC converter, etc.

The output port P1 supplies the power output from the power module 110 to the electric vehicle. The output port P1 may be connected to the charging coupler C through which the connection of the electric vehicle is made. The output port P1 is connected to the charge coupler C, and more specifically, is connected to a power line of the charge coupler C. Although not illustrated, the signal line of the charging coupler C for communication with the electric vehicle may be connected to the control unit 120 of the charger 100 through a line.

Here, the first switch S1 is disposed in a path between the power module 110 and the output port P1. When the first switch S1 is turned on, the power from the power module 110 may be supplied to the electric vehicle 10.

The sharing port P2 of the charger 100 is connected to a sharing port of at least one neighboring charger, and receives power shared by the neighboring charger or delivers the power of the power module 110 to the neighboring charger.

The second switch S2 is disposed in a path between the power module 110 and the sharing port P2. Here, specifically, the second switch S2 may be installed at a front end of the first switch S1. Of course, the present invention is not limited thereto. In addition, a switch may be additionally disposed between a contact point between the first and second switches S2 and the power module 110.

Here, when the second switch S2 is turned on, the power of the power module 110 is shared to the outside through the sharing port P2, or the power introduced from the sharing port P2 is enabled to be delivered to the front end of the second switch S2. In addition, when both the first and second switches S2 are turned on, both the shared power of the neighboring charger input into the sharing port P2 and an output power supplied from the current power module 110 may be supplied to the electric vehicle 10.

The control unit 120 may control a charging operation of the power module 110 for the AC grid and a discharging operation of the power module 110 for the electric vehicle. In addition, the control unit 120 may control a charging/discharging speed, voltage, current, etc. when the power module 110 is charged/discharged.

The control unit 120 charges the electric vehicle 10 by controlling the operations of the power module 110 and the operations of the respective switches S1 and S2 according to an electric vehicle charging request. Here, when a maximum charging power of the electric vehicle is greater than a rated output power of the charger 100, both the power shared by the neighboring charger in a paired state with a neighboring charger in an idle state which is not currently in use and the power output by the power module 110 are delivered to the output port P1 to charge the electric vehicle 10 rapidly.

In this case, the rated output power of the charger 100 means a maximum power capacity which is emittable per hour by the charger 100, and there are generally various rated output powers such as 50 kW class, 100 W class, 150 kW class, 200 kW class, etc. Currently, most charging stations use the 50 kW class as a rated output of a rapid charger. Here, the 50 kW class means that the power of 50 kW is chargeable. The higher the number, the faster the charging speed, and the 100 kW class is capable of charging a power of 100 kW for one hour, so the power is enabled to be charged twice as fast as the 50 kW class.

In an exemplary embodiment of the present invention, the maximum charging power of the electric vehicle 10 means the maximum charging power capacity that may be absorbed per hour from the battery of the electric vehicle 10, that is, the maximum charging power may mean a charging power capacity corresponding to a maximum charging speed per hour, which may be handled by the electric vehicle 10 and have a standard determined for each vehicle. The charger 100 checks chargeable voltage and current ranges of the electric vehicle when the electric vehicle is connected to the charging coupler C to acquire various information related thereto.

Here, when the maximum charging power of the electric vehicle recognized when connecting the electric vehicle is equal to or less than the rated output power of the charger 100, the control unit 120 turns on only the first switch S1 to charge the electric vehicle 10 by using only the output power of the power module 110.

Of course, even in a situation in which all neighboring chargers are occupied even though the maximum charging power is greater than the rated output power, the electric vehicle is charged by using only the output power of the power module by turning on only the first switch S1.

However, when the maximum charging power of the electric vehicle recognized when connecting the electric vehicle is greater than the rated output power of the charger, the control unit 120 forms pairing with at least one neighboring charger in the idle state, which is currently unoccupied by checking charger occupancy situations of all neighboring chargers on a current network. In addition, the electric vehicle is charged by using the power shared from at least one neighboring charger and the output power of the power module paired. A specific exemplary embodiment thereof is illustrated in FIG. 3.

Figure 3:
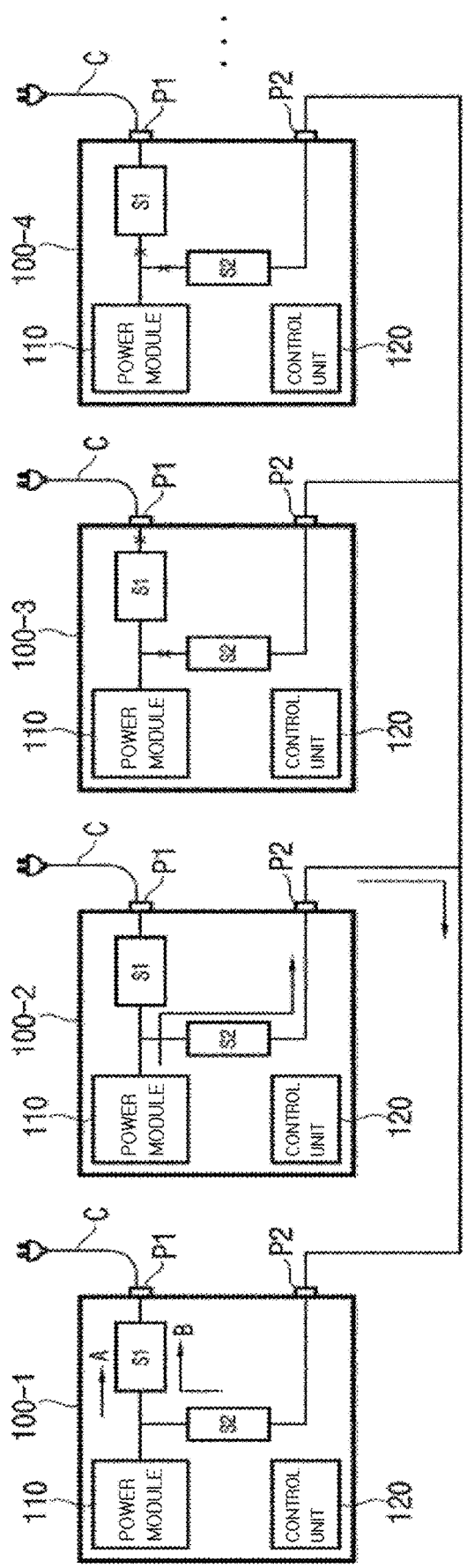
FIG. 3 is a diagram for describing an exemplary embodiment of an electric vehicle charging operation using FIG. 1.
Figure 3:
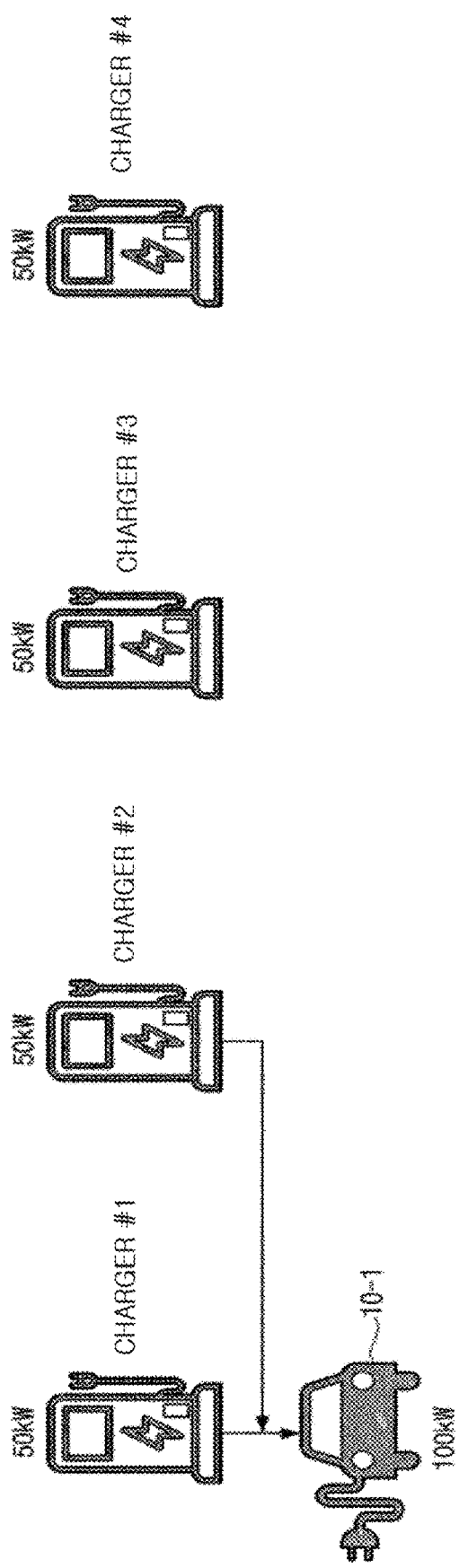

FIG. 3 is a diagram for describing an exemplary embodiment of an electric vehicle charging operation using FIG. 1.

In FIG. 3, all of respective chargers 100; 100-1,100-2, 100-3, and 100-4 as the 50 kW class chargers capable of charging the power of 50 kW per hour are disposed in line with each other. The charging coupler C is connected to the output port P1 of the charger 100, and the sharing ports P2 of the respective chargers 100 are connected to each other. The connection between the port and the port may utilize a general terminal block.

In the case of FIG. 3, there is a state in which an electric vehicle 10-1 is connected to charger #1 100-1 having the 50 kW class, and it is assumed that the charging power capacity corresponding to the maximum charging speed of the electric vehicle 10-1 is 100 kW. Moreover, it is assumed that all chargers 100-1 to 100-4 are in the idle state before connecting the electric vehicle.

Specifically, the maximum charging power of 50 kW of charger #1 100-1 is twice as large as the maximum charging power capacity of 100 kW of the electric vehicle 10-1, and the remaining neighboring chargers are currently unoccupied, that is, in the idle state, so pairing with at least one neighboring charger among them is formed.

In FIG. 3, charger #1 100-1 forms the pairing with charger #2 100-2 closest to charger #1 100-1 and charger #2 100-2 turns on the second switch S2 while the first switch S1 is turned off as it is to emit the power stored in the power module 110 and output the emitted power through the sharing port P2.

Charger #1 100-1 outputs a power A emitted from the power module 110 thereof and outputs a sharing power B input from the sharing port P2 through the output port P1 by turning on both the first and second switches S2 to enable charging twice as fast as a case of using only charger #1 alone. For example, if one hour is required for charging approximately 50 kW with one charger, when one charger is additionally used, the charger is variable to 100 kW class, 1 hour may be shortened to 30 minutes which is a half thereof. That is, in FIG. 3, two 50 kW class chargers are connected to show the same effect as one 100 kW class charger.

In general, when the electric vehicle 10-1 in which up to 100 kW is chargeable is charged in connection with the 50 kW class charger 100, the charging speed is enabled only up to a speed of a maximum of 50 kW class. However, in FIG. 3, it is possible to implement the charging speed up to a maximum speed of 100 kW class which may be handled by the electric vehicle 10-1 by additionally connecting one charger in addition to a charger to which the current electric vehicle 10-1 is connected.

Even when the maximum charging power capacity of the electric vehicle 10-1 connected to charger #1 100-1 is 80 kW between 50 kW and 100 kW, the power of charger #2 100-2 may be shared similarly thereto. Of course, in this case, even though one charger is additionally used, the speed of 100 kW may not be achieved, and the charging speed may be limited to a maximum of 80 kW class according to a vehicle specification. However, charging is enabled more rapidly than in the case of using only one charger.

In an exemplary embodiment of the present invention, the control unit 120 may determine the maximum connection number of neighboring chargers by using a ratio acquired by dividing the maximum charging power by the rated output power. In this case, when a natural number M acquired by decimal rounding up of the ratio is a value equal to or greater than 2, the power may be shared in a paired state with a maximum of M−1 idle-state neighboring chargers. In the case of FIG. 3, since M=2, it can be seen that a maximum of two neighboring chargers are paired with up to one neighboring charger.

As such, according to an exemplary embodiment of the present invention, as a rated capacity which is providable by the charger is increased by sharing the power from the charger which is currently unoccupied, the electric vehicle may be charged rapidly.

That is, as a charging power capacity per hour which is providable to the electric vehicle is increased in units of the multiple by utilizing the power of the charger which is currently unoccupied in the charging station, the charging speed of the electric vehicle may be increased in proportion to the number of utilized chargers.

Figure 4:
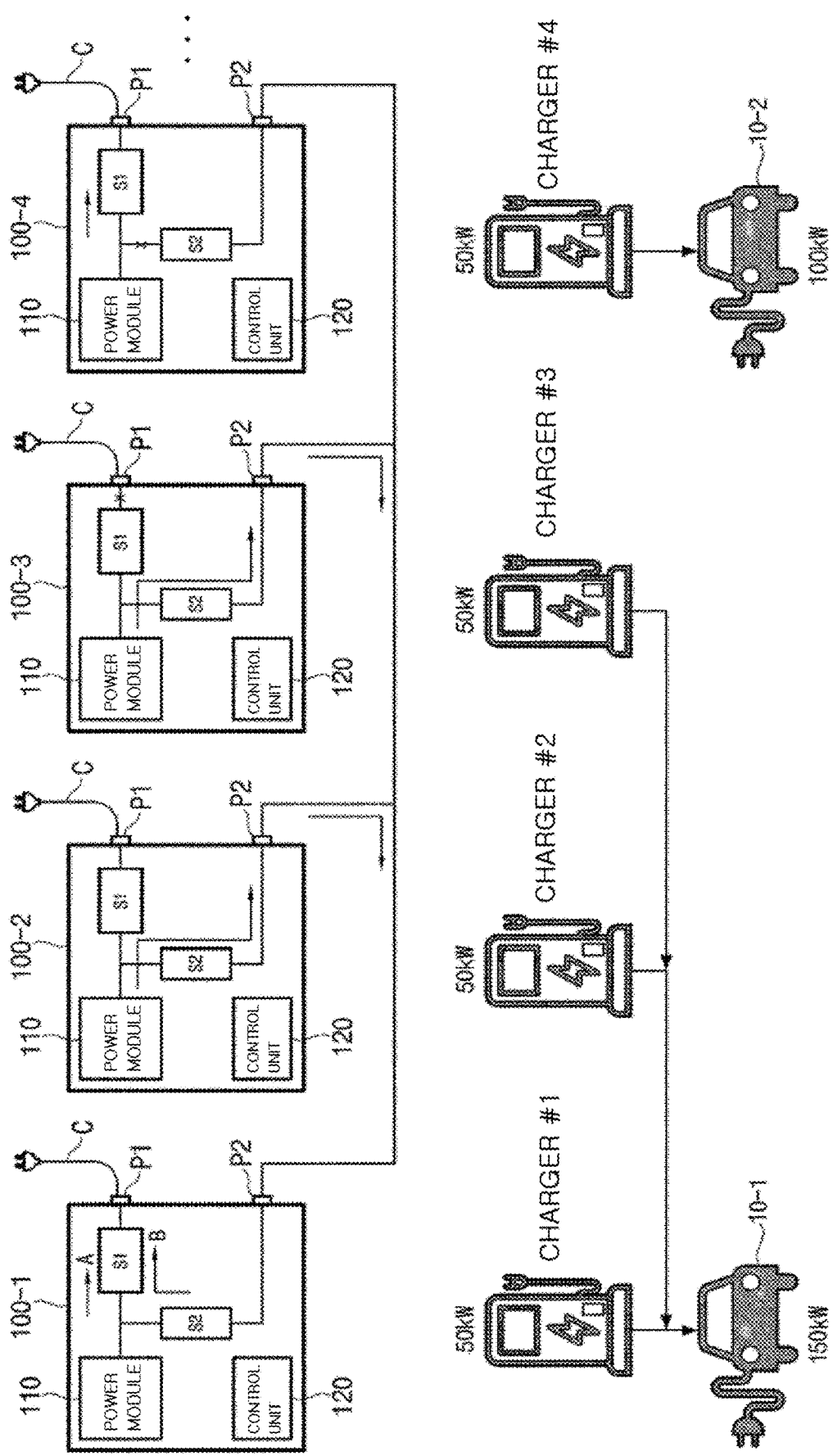
FIG. 4 is a diagram for describing another exemplary embodiment of an electric vehicle charging operation using FIG. 1.

FIG. 4 is a diagram for describing another exemplary embodiment of an electric vehicle charging operation using FIG. 1.

In FIG. 4, it is assumed that all of respective chargers 100; 100-1,100-2,100-3, and 100-4 are the 50 kW class chargers capable of charging the power of 50 kW per hour, and the 150 kW class electric vehicle 10-1 is connected to charger #1 100-1. Moreover, it is assumed that before connecting the electric vehicle, charger #4 100-4 is already occupied by another electric vehicle 10-2, and the remaining chargers #2 and #3 100-2 and 100-3 are in the idle state.

In this case, the maximum charging power of 50 kW of charger #1 100-1 is three times greater than the maximum charging power capacity of 150 kW of the electric vehicle 10-1, and charger #4 100-4 is currently being charged or occupied by another electric vehicle 10-2, pairing may be formed among the remaining second and third chargers 100-2 and 100-3.

Further, in this case, since a ratio value M is 3, the maximum number of additionally connectable chargers becomes two. In FIG. 4, since chargers #2 and #3 are in the idle state, charging is performed by utilizing both the chargers. Here, of course, for example, if charger #3 is also currently being occupied, only charger #2 may be connected and used.

As such, in FIG. 4, charger #1 100-1 forms the pairing with chargers #2 and #3 100-2 and 100-3, and chargers #2 and #3 100-2 and 100-3 emit the powers stored in the power modules 110 thereof by turning on the second switch S2 while maintaining the turn-off of the first switch S1 as it is, and outputs the emitted power through the sharing ports P2, respectively.

Charger #1 100-1 outputs the power A emitted from the power module 110 thereof and the sharing power B input from the sharing ports P2 of chargers #2 and #3 100-2 and 100-3 simultaneously through the output port P1 by turning on both the first and second switches S2 to enable charging three times as fast as the case of using only charger #1 alone. For example, if one hour is required for charging approximately 50 kW with one charger, when three chargers are additionally used, the charger is variable to 150 kW class, 1 hour may be shortened to 20 minutes which is one third thereof. That is, in FIG. 4, three 50 kW class chargers are connected to show the same effect as one 150 kW class charger.

Figure 5:
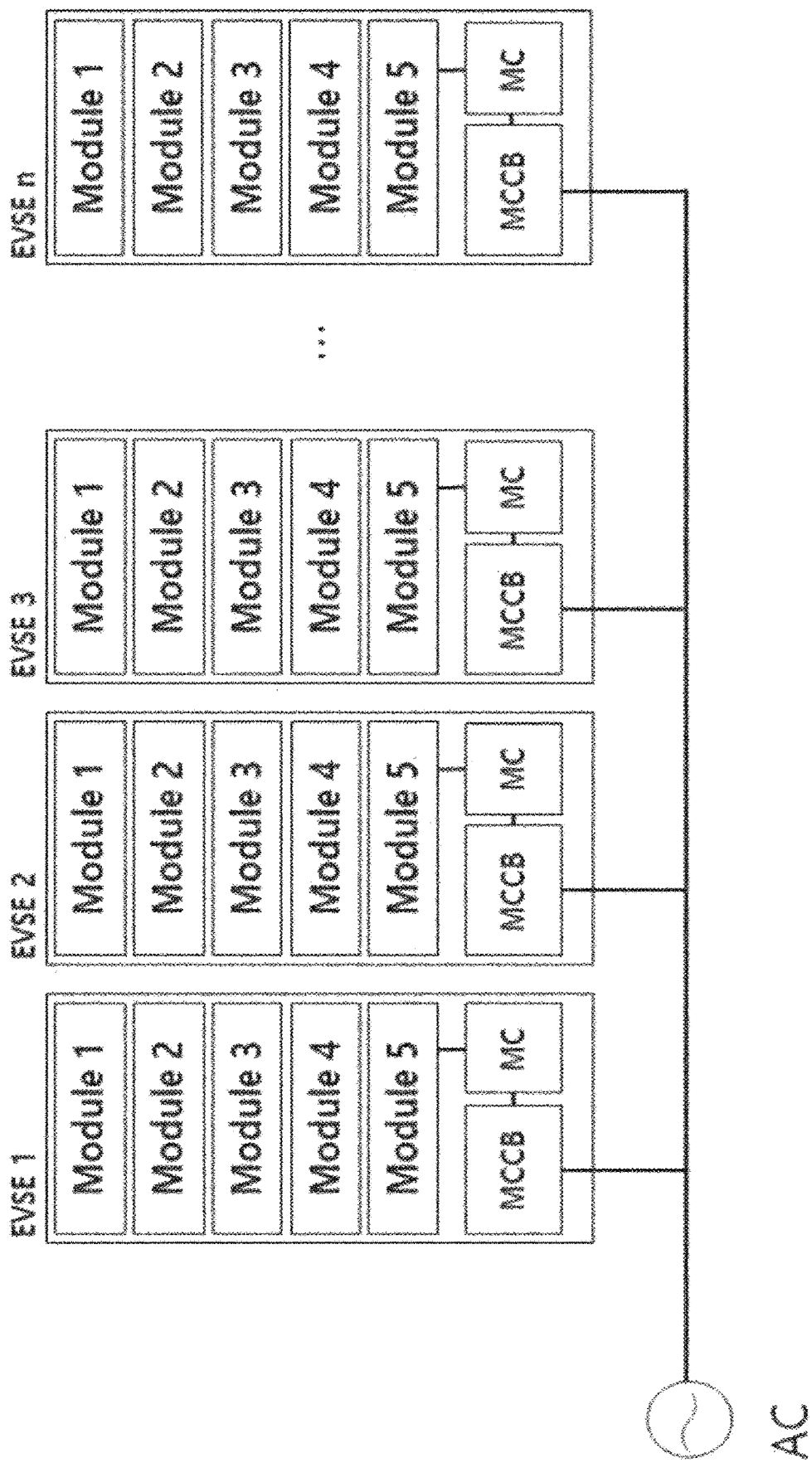
FIG. 5 is a diagram illustrating a state in which each charger illustrated in FIG. 1 receives a power from an AC grid.

FIG. 5 is a diagram illustrating a state in which each charger illustrated in FIG. 1 receives a power from an AC grid.

As illustrated in FIG. 5, respective chargers EVSE1 to EVSEn may supply the power from the AC grid to each embedded module. In a charger EVSE, an MCCB, circuit breaker, is installed at the front end connected to the grid to protect the device. In addition, the charger EVSE utilizes a microcontactor MC to prevent the use of constant standby power of the power. Through this, an AC input is supplied to each of the modules in the EVSE 100. The charger EVSE may convert AC power received from the grid into DC power and supply the DC power to the electric vehicle. Of course, the DC power is converted into an appropriate DC voltage, which may be supplied. FIG. 5 is just one exemplary embodiment, and the EVSE structure proposed in the present invention is not particularly limited thereto.

Figure 6:
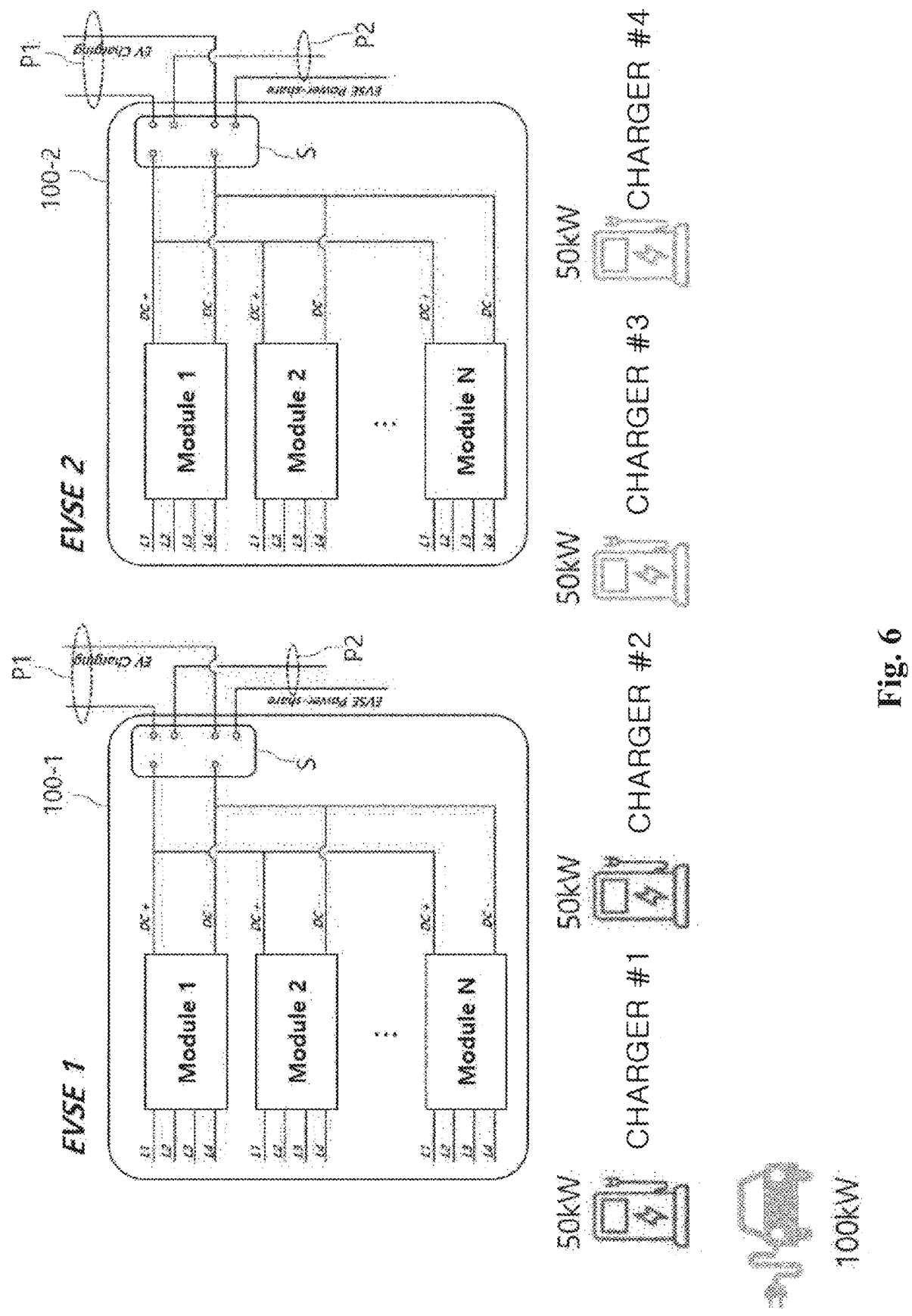
FIG. 6 is a diagram specifying an internal configuration of a charger for a situation of FIG. 3.

FIG. 6 is a diagram specifying an internal configuration of a charger for a situation of FIG. 3.

The upper part of FIG. 6 specifically illustrates internal configurations of the chargers #1 and #2 in the situation of FIG. 3, and at this time, chargers #3 and #4 are omitted for convenience of description.

Each module inside the charger 100 may correspond to an element of the power module, and a four-phase connection method is exemplified. Here, of course, various methods such as 3-phase and 4-phase may be applied.

Further, a part marked with S is a simplified illustration of a switch part that connects or disconnects the power module and each port. Here, each line is shown in double. Two lines for P1 represent positive and negative terminals of the output port, and two lines for P2 represent the positive and negative terminals of an intrinsic port.

In the drawing, a red mark line means a state in which the line of the corresponding port is activated, and a black mark line means a state in which the line is deactivated. Therefore, in the case of charger #1 100-1, both ports P1 and P2 are in an active state, and both the power being output from the power module thereof and the power input from charger #2 100-2 through the sharing port P2 may be output to the output port P1. Since charger #2 100-2 performs only an operation of sharing the power thereof, only the sharing port P2 is activated and the output port P1 is deactivated.

FIG. 6 illustrates an internal structure of the charger in more detail, but the present invention is not particularly limited thereto.

Figure 7:
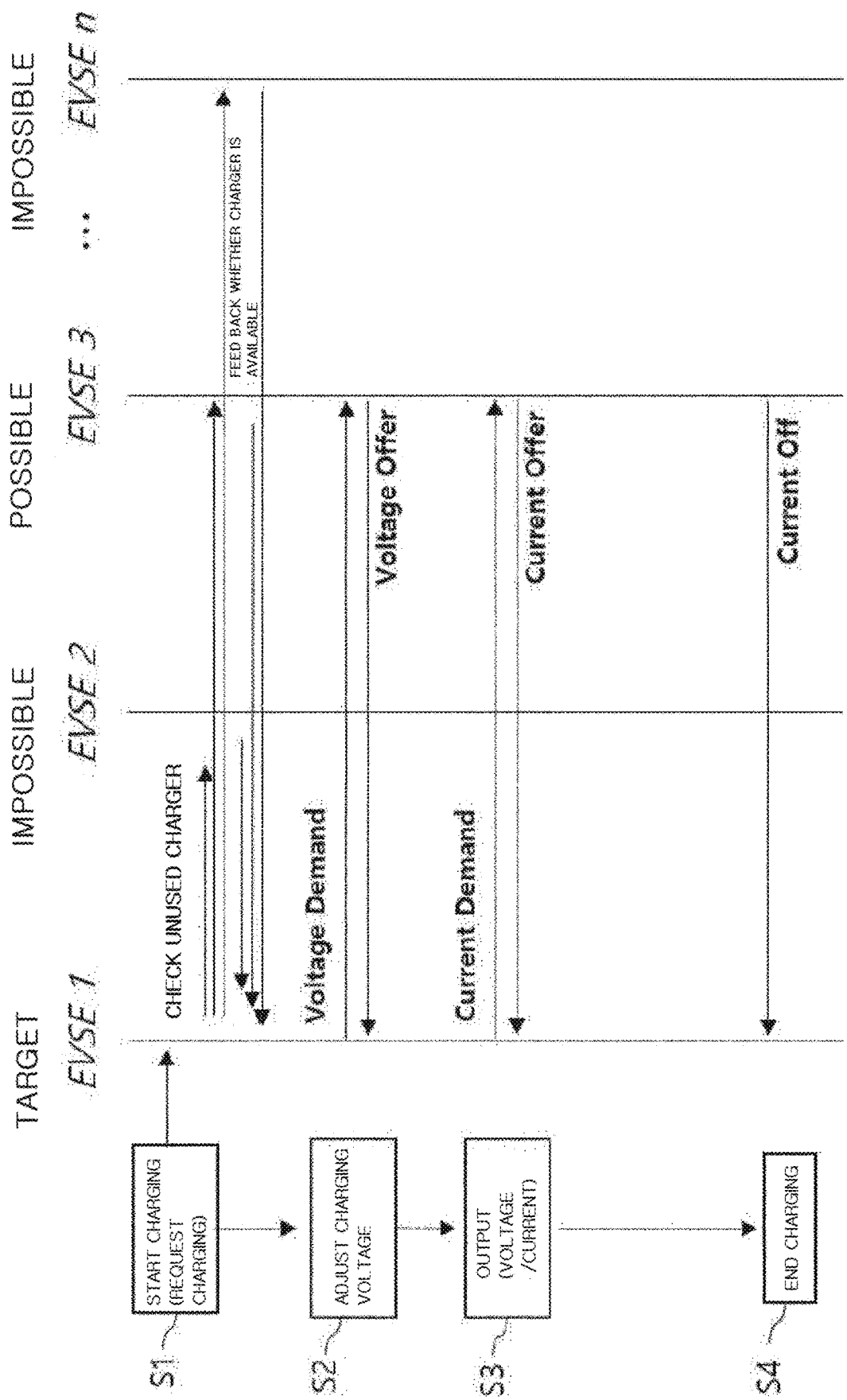
FIG. 7 is a diagram for describing an intern-charger power sharing process in the system of FIG. 1.

FIG. 7 is a diagram for describing a power sharing process through communication between chargers in the system of FIG. 1.

First, an EV vehicle enters a parking surface of the charging station, and a touch screen of charger #1 EVSE1 is manipulated by a user and a charging method, such as, charging cost, a charging amount, a payment scheme, etc., is selected, and a cost payment procedure is performed.

When payment is completed through a payment means, charger #1 EVSE1 checks the connection of the charging coupler. The charger may check whether the coupler is connected to a charging port of the vehicle by using an electric signal observed when connecting the coupler to the charging port of the vehicle.

As such, when the charging cost payment is completed, and the EV vehicle is connected to the charging coupler, charger #1 EVSE1 generates a charging request event in S1. At this time, charger #1 EVSE1 checks information such as a battery charging standard when the electric vehicle is connected.

At this time, when a charging request event occurs, charger #1 EVSE1 sends a signal to peripheral chargers EVSE2 to EVSEn connected on the network to check whether the chargers are currently in use, and receives a response thereto to check whether there is an unused charger.

As a result, the currently unused charger #3 EVSE3 is selected, and the EV vehicle is charged by sharing power from charger #3. At this time, charger #1 requests the charging voltage to charger #3 to adjust the charging voltage in S2, again requests a current value for a desired output to charger #3, and is shared with power with the corresponding current and voltage to charge the EV vehicle in S3. Thereafter, when the current value becomes zero, charging is terminated in S4.

According to the present invention, when an electric vehicle charging request is made, electric power is additionally shared from an unoccupied charger in consideration of a current occupancy situation of peripheral chargers, and power higher than a rated capacity determined per charger is provided to an electric vehicle, thereby charging the electric vehicle more rapidly.

In particular, in the case of the present invention, provided is an effect that a power corresponding to n multiples of the rated capacity specified per charger can be provided to an electric vehicle based on a power shared in a neighboring charger, so an electric vehicle charging time can be reduced by 1/n as compared with a case of utilizing only one charger.

The present invention has been described with reference to the exemplary embodiment illustrated in the drawings, but this is just exemplary and it will be appreciated by those skilled in the art that various modifications and other exemplary embodiments equivalent thereto can be made therefrom. Accordingly, the true technical scope of the present invention should be defined by the technical spirit of the appended claims.

The present invention is applicable in an electric vehicle charging industry.

The invention claimed is:

1. A distributed power sharing type electric vehicle charging system comprising: a plurality of chargers connected through a network,
wherein each of the plurality of chargers includes:
a power module storing a DC power;
an output port supplying a power output from the power module to an electric vehicle;
a sharing port interconnected to a sharing port of at least one neighboring charger of the plurality of chargers, and receiving power shared by the at least one neighboring charger or delivering power of the power module to the at least one neighboring charger;
first and second switches installed between the power module and the output port and between the power module and the sharing port, respectively; and
a control unit controlling operations of the power module and the first and second switches according to an electric vehicle charging request, and, when maximum charging power of the electric vehicle is greater than rated output power of the charger, delivering both the power shared by the at least one neighboring charger in a paired state with the at least one neighboring charger in a current idle state, and the power output by the power module to the output port to rapidly charge the electric vehicle,
wherein, each of the plurality of chargers and the respective sharing port adjacent to each other in terms of a distance are connected to each other by a cable, and
wherein the control unit determines the maximum connection number of the at least one neighboring charger by using a ratio acquired by dividing the maximum charging power by the rated output power.

2. The distributed power sharing type electric vehicle charging system of claim 1, wherein when the maximum charging power of the electric vehicle recognized when connecting the electric vehicle is equal to or less than the rated output power of the charger, the control unit turns on only the first switch to charge the electric vehicle by using only the output power of the power module.

3. The distributed power sharing type electric vehicle charging system of claim 1, wherein when the maximum charging power of the electric vehicle recognized when connecting the electric vehicle is greater than the rated output power of the charger, the control unit forms pairing with the at least one neighboring charger in the idle state, which is currently unoccupied by checking charger occupancy situations of all neighboring chargers on the network, and
the electric vehicle is charged by using the power shared from the at least one neighboring charger and the output power of the power module paired.

4. The distributed power sharing type electric vehicle charging system of claim 3, wherein when the maximum charging power is greater than the rated output power and the all neighboring chargers are being occupied, the control unit turns on only the first switch to charge the electric vehicle by using only the output power of the power module.

5. The distributed power sharing type electric vehicle charging system of claim 1, wherein when a natural number M acquired by decimal rounding up of the ratio is a value equal to or greater than 2, the control unit shares the power in a paired state with a maximum of N−1 idle-state neighboring chargers.

6. The distributed power sharing type electric vehicle charging system of claim 1, wherein the rated output power of the charger is a maximum power capacity emittable per hour from the charger, and
the maximum charging power of the electric vehicle is a maximum charging power capacity absorbable per hour in a battery of the electric vehicle.

* * * * *